United States Patent [19]

Wald et al.

[11] 4,143,417
[45] Mar. 6, 1979

[54] PORTABLE DATA-GATHERING APPARATUS FORMED BY MODULAR COMPONENTS HAVING OPERATE-STANDBY MODES

[75] Inventors: Gerald R. Wald, Saratoga; Daniel J. Weaver, San Jose; Michael J. Piccardo, Sunnyvale; James B. McLaughlin, Huntington Beach, all of Calif.; Robert Treiber, Centerport, N.Y.

[73] Assignee: The Singer Company, Binghamton, N.Y.

[21] Appl. No.: 734,710

[22] Filed: Oct. 21, 1976
(Under 37 CFR 1.47)

[51] Int. Cl.² .......................... G06F 3/06; G06F 3/04
[52] U.S. Cl. .................................................. 364/900
[58] Field of Search ................. 364/900 MS File, 900

[56] References Cited

U.S. PATENT DOCUMENTS

| | | | |
|---|---|---|---|
| 3,771,132 | 11/1973 | Biewer | 340/172.5 |
| 3,823,388 | 7/1974 | Chadima et al. | 340/172.5 |
| 3,940,742 | 2/1976 | Hudspeth et al. | 340/172.5 |
| 3,941,989 | 3/1976 | McLaughlin et al. | 235/156 |
| 3,942,157 | 3/1976 | Asure | 340/172.5 |
| 3,956,740 | 5/1976 | Jones et al. | 340/172.5 |
| 3,971,925 | 7/1976 | Wenninger et al. | 235/156 |
| 4,007,443 | 2/1977 | Bromberg et al. | 340/172.5 |
| 4,019,174 | 4/1977 | Vanderpool et al. | 340/172.5 |
| 4,025,766 | 5/1977 | Ng et al. | 235/152 |

FOREIGN PATENT DOCUMENTS 2145428   4/1973   Fed. Rep. of Germany ........... 364/900

*Primary Examiner*—Gareth D. Shaw
*Assistant Examiner*—C. T. Bartz
*Attorney, Agent, or Firm*—Paul Hentzel; Jeffrey Rothenberg

[57] ABSTRACT

A hand-held data-gathering unit is formed by removably connected control and power modules: The control module contains a keyboard, a display device, a data input probe, and a microprocessor. The power module contains a rechargeable battery with a converter and associated power logic, and a memory system with associated memory control logic. The hand-held unit has a normal low-power standby mode which is maintained during the absence of input data from either the keyboard or the data probe, and an operation mode which is initiated by the arrival of input data. During the operation mode, input data enters the control module and is forwarded to the memory in the power module. As data is gathered during portable operation, the memory may reach capacity or the battery voltage may drop, or both. The power module may be removed from the control module and replaced by a fresh power module with a fully charged battery and an empty memory. The expired power module is inserted into a service module for charging the battery or transmitting the data to a remote terminal, or both. The control module may also be inserted into the sevice module where it is activated by a stationary power supply and interfaced with the memory in the power module for stationary operation. In addition to transmitting the contents of the memory, the service module may receive data from the remote terminal and for storage in the memory. This received data may then be accessed and displayed through the control module.

16 Claims, 6 Drawing Figures

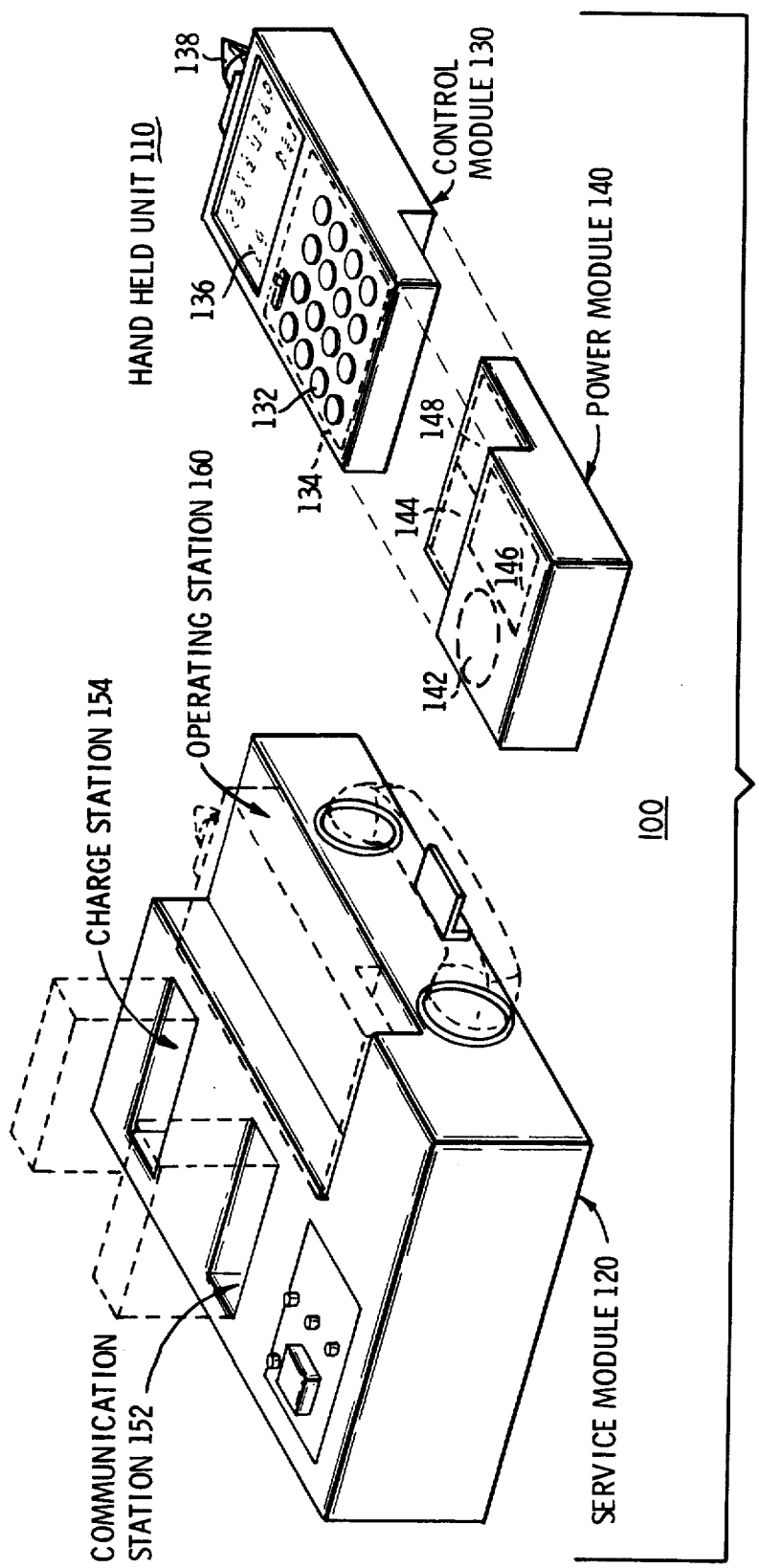
Fig_1

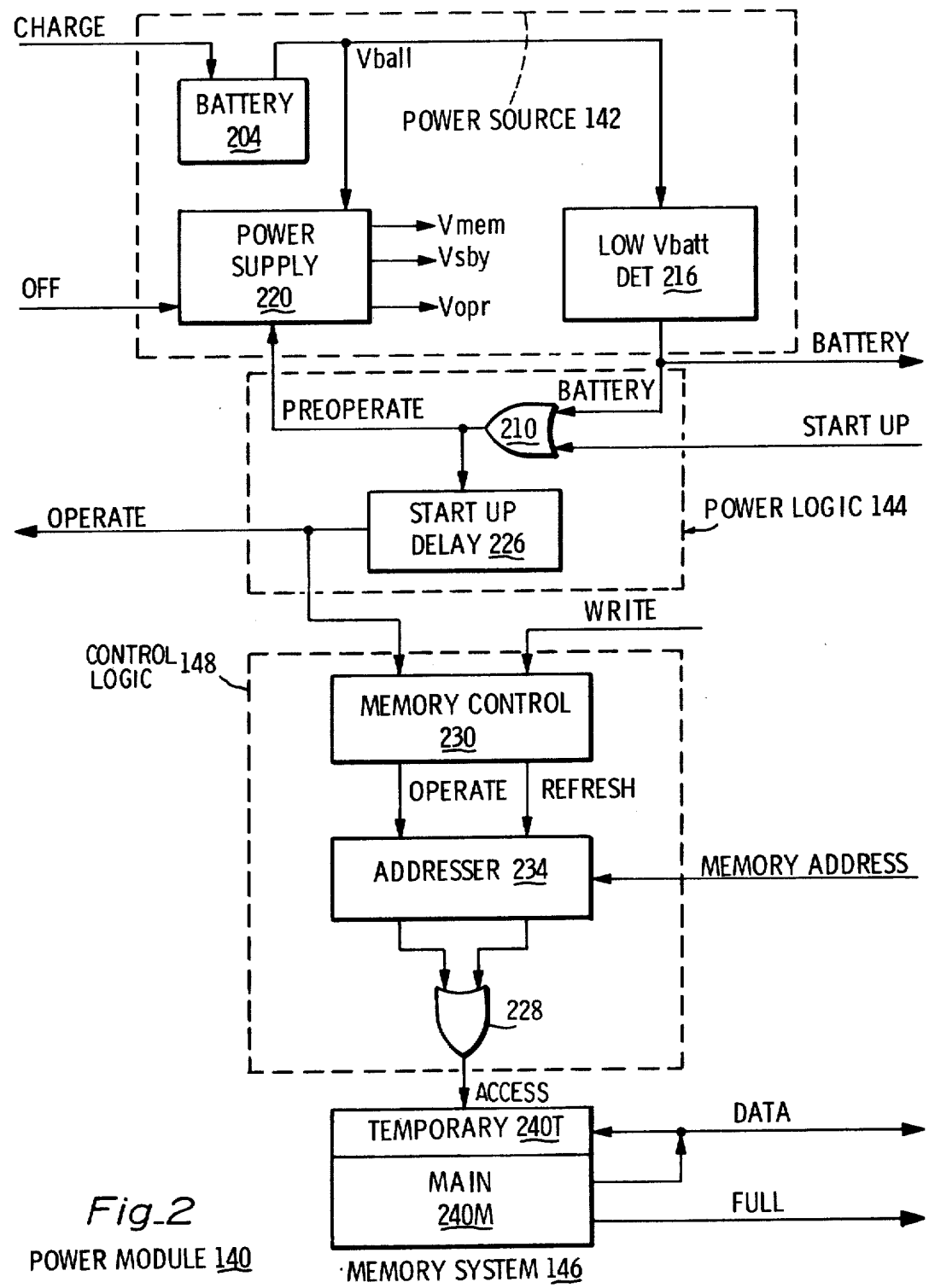
Fig_2
POWER MODULE 140

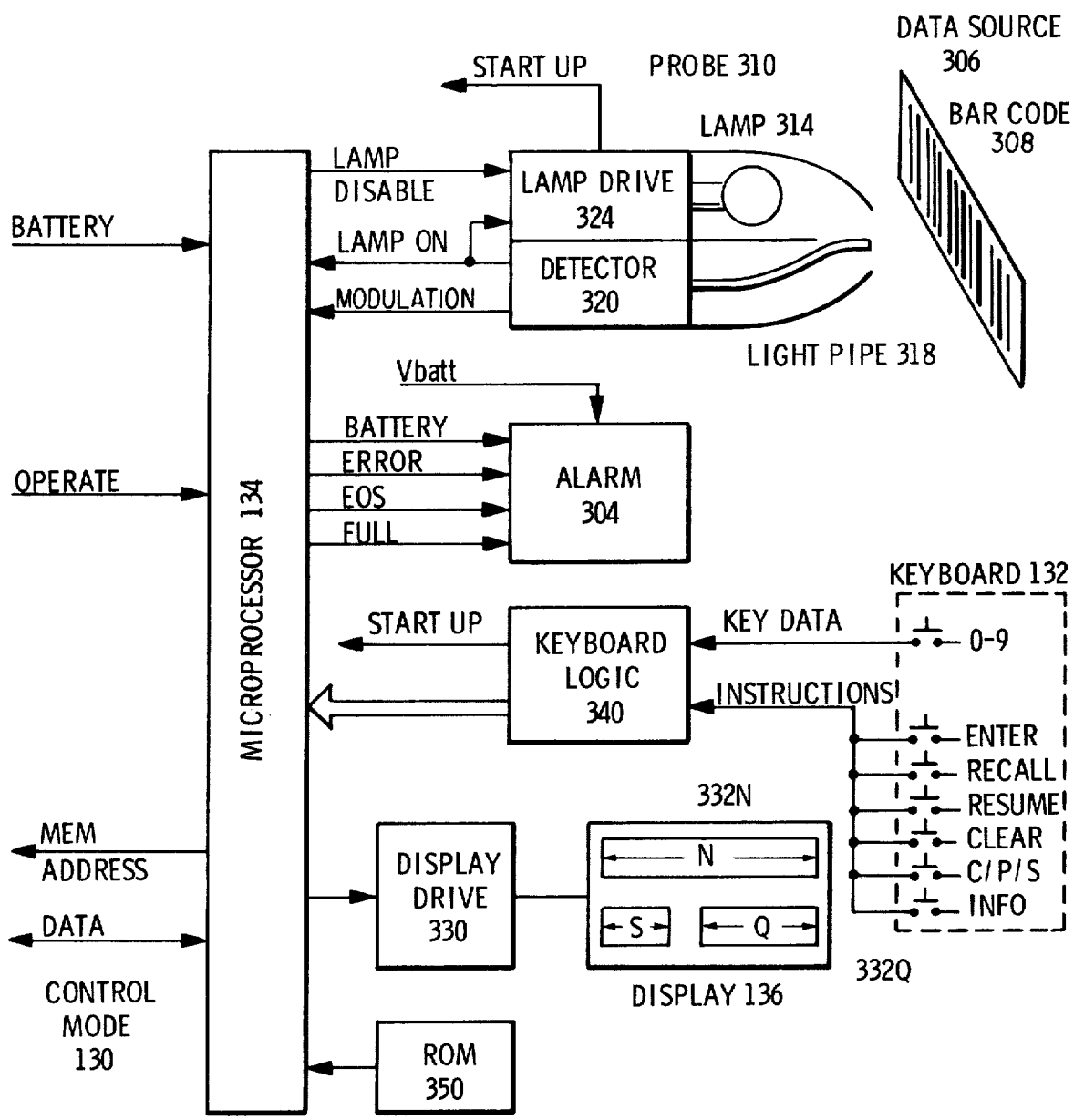
Fig_3

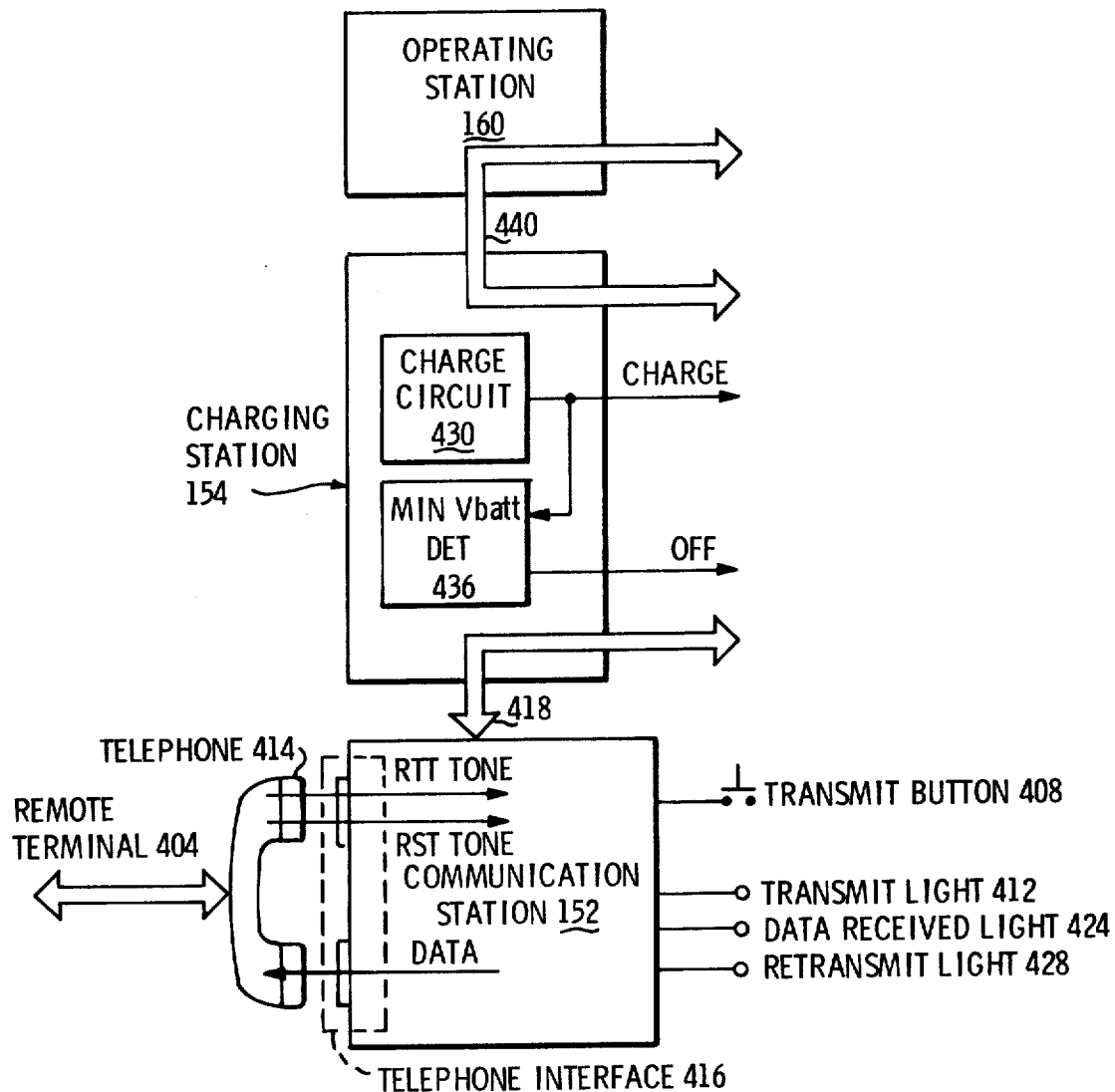
Fig_4
SERVICE MODULE 120

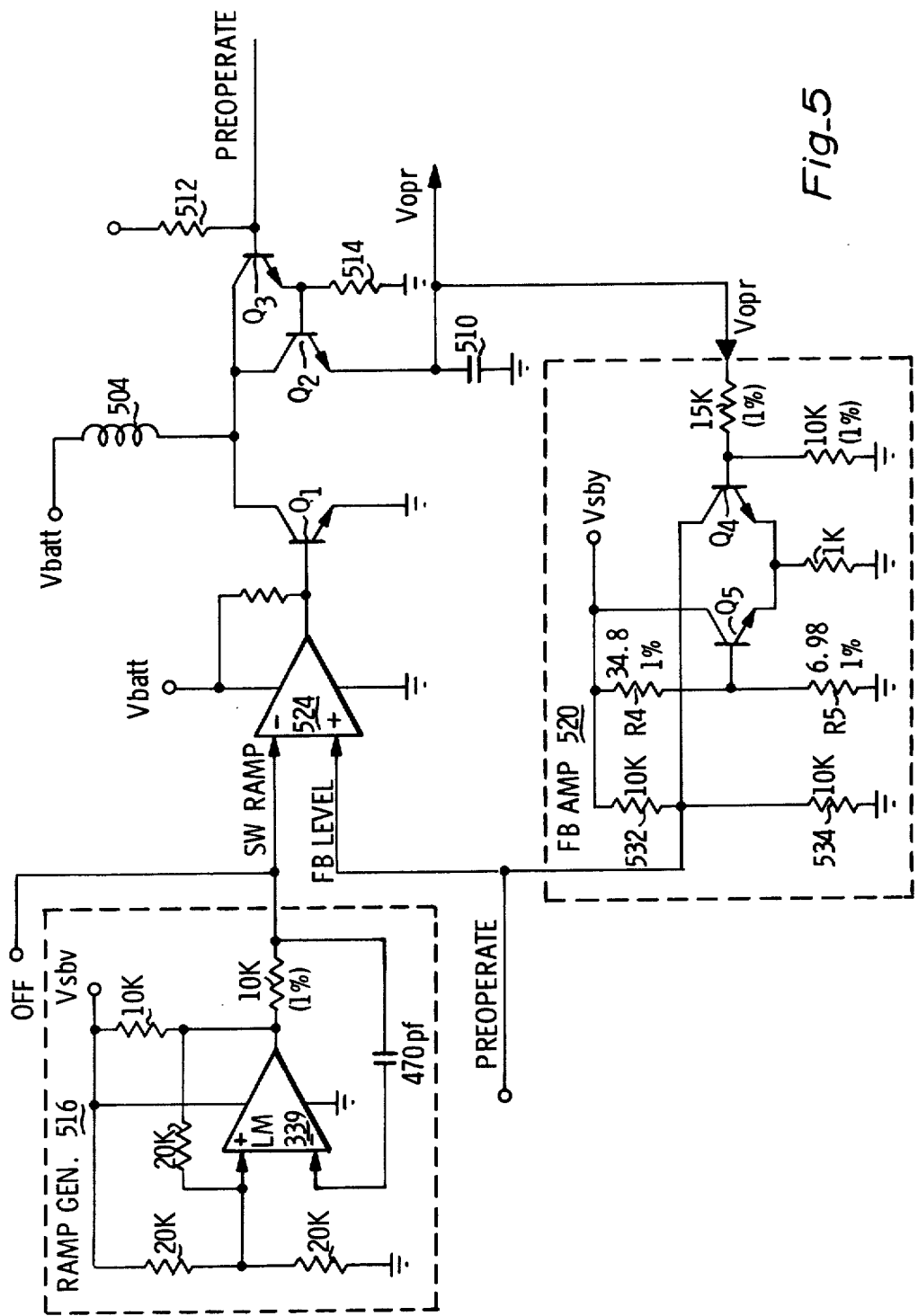

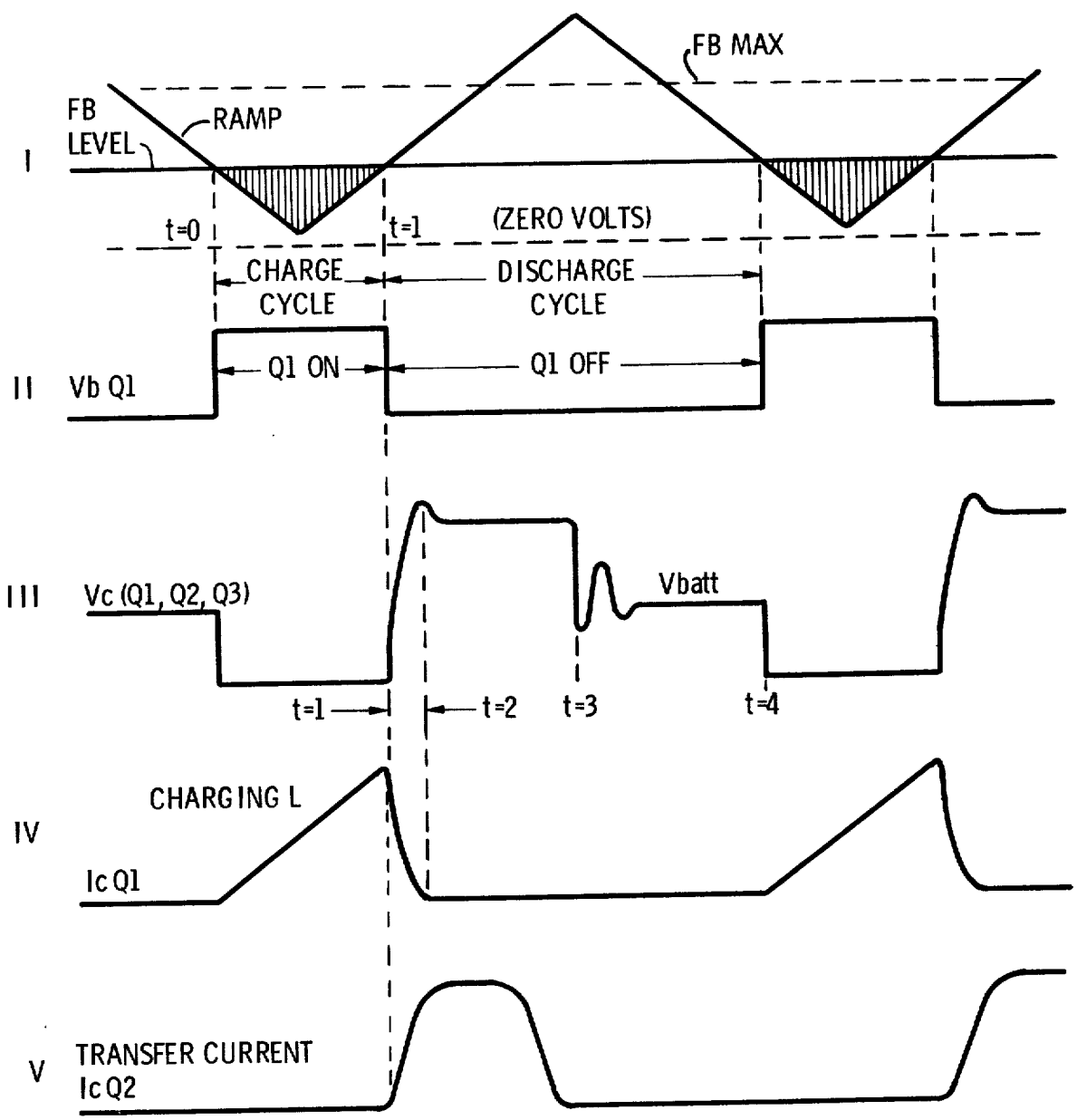
Fig_6

4,143,417

PORTABLE DATA-GATHERING APPARATUS FORMED BY MODULAR COMPONENTS HAVING OPERATE-STANDBY MODES

FIELD OF INVENTION

The present invention relates to battery-powered portable data-gathering apparatus for reading and recording bar code, and more particularly to such portable apparatus having modular components which interface independently with a stationary component.

DISCUSSION OF THE PRIOR ART

Heretofore, portable data-gathering apparatus have employed magnetic recording tape in cassette form for data storage. These cassette devices were bulky, heavy, and had a high power requirement. Typically the operator carried a shoulder-supported power supply plus a large hand-held unit which contained the cassette, the drive and recording mechanisms, and the data control and entry logic. The cassette devices required constant repair and adjustment to maintain timing sync between the tape speed, the keyboard logic clock, and the remote computer which interfaced with the cassette device from time to time to receive the data gathered in the cassette. A further disadvantage of the prior art cassette device involved searching the record for a particular entry previously made. The tape must be reviewed chronologically by play back through the tape head. This slow process was additionally burdened by inter-record gaps created each time the tape started and stopped, and by word flags for defining the beginning and ending of each word on the tape. In addition, the ability to interchange memory cassettes between data-gathering devices was limited by the nonuniformity in head skew alignment.

U.S. Pat. No. 3,942,157 to Azur teaches a completely hand-held, solid state memory, data-gathering unit which does not require a shoulder power pack. However, the Azur device is a one-piece unit in which the memory and battery portion cannot be separated from the control portion. During portable operation as the memory approaches capacity or the battery discharges, the entire hand-held unit must be inserted into a service module for data transmission or recharging. The control logic, keyboard, and display are hardwire dedicated to a particular memory and power supply. These portions cannot function independently and are therefore unusable during charging or transmission. Further, the Azur device does not employ a low-power standby mode for conserving energy when data is not actually being processed. The Azur device has a single operating mode which uses approximately the same power whether data is being processed or not.

The prior art data gathering devices generally required input data to be entered through the keyboard or through a light sensitive probe at the end of a flexible cord. Both entry techniques required two hands — one hand for holding the portable unit and the other hand for operating the keyboard or probe.

SUMMARY OF THE INVENTION

It is therefore an object of this invention to provide a portable data-gathering system:

which is smaller, requires less power, has no moving parts, and has low maintenance requirements;

which conserves power by means of a dominant low-power standby mode maintained in the absence of input data;

in which the memory and power supply portion may be detached from the control and display portion, and replaced by another memory and power supply portion;

in which the detached memory power supply portion may be recharged or transmitted independently of the control portion;

in which the detached control portion may be reinterfaced with the power memory portion through a service module;

wherein the memory and power supply are inseparably mounted within the same module;

which has a built-in data probe which permits the operator to scan a data source using only one hand to support and move the device.

Briefly, the present invention accomplishes these and other objects and advantages by providing a hand-held unit formed by a control module and a detachable power-memory module, both of which interface separately with a service module. The control module receives input data and controls the data flow within the hand-held unit. The power module contains a memory for storing the data processed thereto by the control module, and a rechargeable battery for maintaining the data in the memory and for activating the control module. The hand-held unit contains a mode device for maintaining a low-power level standby mode when no input data is available for processing. The mode device temporarily establishes an operating mode having a higher power requirement for processing input data as required. The service module serves to recharge the battery, to permit transmission of the data into and out of the memory, and to reinterface the control module with the power-memory module for stationary operation.

BRIEF DESCRIPTION OF THE DRAWING

Further objects and advantages of this invention and the operation of the converter circuit will become apparent to those skilled in the art from the following detailed descriptions taken in conjunction with the drawings, in which:

FIG. 1 is an isometric view of the power module and control module which form the portable hand-held unit, and the service module which cooperates therewith to provide stationary operation;

FIG. 2 is a block diagram of the power module showing the memory and memory control circuitry;

FIG. 3 is a block diagram of the control module showing the microprocessor and peripheral hardware;

FIG. 4 is a block diagram of the service module showing the charging and transmission features;

FIG. 5 is a schematic of the power converter which shows cascaded switches in series between the input inductor and the output capacitor; and FIG. 6 shows the waveforms at various points in the FIG. 5 circuit.

GENERAL SYSTEM

FIG. 1 shows a portable data gathering system 100, and FIGS. 2, 3, and 4 are related block diagrams of data flow and control features. System 100 includes a portable hand-held unit 110 and a stationary service module 120. Hand-held unit 110 is separable into a control module 130 and a power module 140. Control module 130 contains keyboard 132 for entering data (KEY DATA) and instructions (INSTRUCTIONS) to control logic 134, and an alphanumeric display 136 for displaying data from data port 138 (PORT DATA)

Power module 140 contains a power source 142 and power control logic 144 for providing a low power STANDBY MODE when control module 130 is not active, and an OPERATE MODE when new data enters control module 130. A standby voltage (Vsby) is applied throughout unit 110 to maintain the standby status. During the OPERATE MODE power source 142 applies an operate voltage (Vopr) to activate data flow and control circuits. Power module 140 also contains a suitable storage device such as solid state memory system 146 and accompanying control logic 148 for receiving and storing data from control module 130. Memory system 146 is mounted on same module as power source 142 and always receives a memory sustaining voltage (Vmem) therefrom. As a result, the data in memory system 146 cannot be unintentionally erased by disconnecting the power.

New data such as product numbers is entered into solid state memory 146 automatically as PORT DATA through data port 138 or manually as KEY DATA through keyboard 132. Keyboard 132 may also have provisions for additional functions to accommodate various other categories of data such as price and quantity, and to recall data from memory 146 onto display 136. When memory 146 reaches capacity, power module 140 is removed from control module 130 and inserted into communication station 152 of service module 120 (as shown in dashed lines) for transmitting the data in memory system 146 to a remote terminal. The battery 204 in power source 142 may be recharged at station 142 simultaneously with transmission. Alternatively, power module 140 may be inserted into charge station 154 (as shown in dashed lines) for storage and charging. Control module 130 may be inserted into operate station 160 (as shown in dashed lines) where it is reactivated and reconnected with memory system 146 in power module 140. Modules 130 and 140 become fully operative as a stationary data gathering device when mounted in service module 120.

STANDBY-OPERATE MODES

Hand-held unit 110 is normally in a low power STANDBY MODE in which many of the subsystems circuits are deactivated to conserve power in battery 204.

OPERATION MODE is initiated by PORT DATA from data port 138 or KEY DATA and INSTRUCTIONS from keyboard input 132. Microprocessor 134 responds to these signals by forwarding START UP to power logic 144 in power module 140 (see FIG. 2). Startup gate 210 combines START UP with BATTERY from low Vbatt detector 216 to form PREOPERATE to power supply 220 causing the generation of the operating voltage (Vopr) intiating OPERATION MODE. Vopr activates the operating circuits throughout system 110 allowing microprocessor 134 to process data. OPERATION MODE cannot be established when battery 204 approaches discharge and Vbatt drops below a predetermined low value (Vlow). BATTERY inhibits gate 210 preventing the generation of Vopr. The remaining power in battery 204 is dedicated to maintaining the data in memory system 146. BATTERY to microprocessor 134 causes activation of alarm 304 (see FIG. 3).

Shortly after PREOPERATE startup delay circuit 226 provides OPERATE to memory control 230 which generates an internal REFRESH signal. Either OPERATE or REFRESH into addresser 234 enables gate 228 causing ACCESS into memory system 146. ACCESS present during STANDBY MODE prevents addresses from reaching memory system 146 (formed by temporary memory 240T and main memory 240M) by inhibiting a series of internal address gates. ACCESS additionally protects the data in memory 240 from spurious input by placing memory 240 in the read mode. ACCESS enables the address gates and permits memory 240 to be in either the write mode (WRITE) or the read mode (WRITE) as determined by the microprocessor 134.

OPERATION MODE is terminated by the expiration of a WAIT PERIOD (three seconds, for example) in microprocessor 134 initiated at START UP. WAIT PERIOD is renewed by each new PORT DATA, KEY DATA, or INSTRUCTIONS item.

PORT DATA

PORT DATA originates from a data source such as product label 306 in suitable form such as bar code 308 (see FIG. 3). PORT DATA enters hand-held unit 110 through data port 138 on probe 310 extending from control module 130. Probe 310 is placed proximate data source 306. Probe lamp 314 iluminates data source 306 causing initial reflected light to be conducted by light pipe 318 into light detector 320. Hand-held unit 110 is moved or turned slightly causing data port 138 to scan across data source 306. During scanning bar code 308 causes modulations in the reflected light level to detector 320 which forwards MODULATION to microprocessor 134. MODULATION cannot be processed through microprocessor 134 during STANDBY MODE.

In STANDBY MODE lamp drive 324 pulses lamp 314 periodically illuminating the region immediately adjacent data port 138. Once or twice a second is a suitable pulse rate. The pulse rate is established by an internal oscillator in lamp drive 324. STANDBY MODE continues until the initial reflected light is returned through data port 138 into detector 320. Detector 320 then forwards LAMP ON to lamp drive 324 which inhibits the internal pulsing oscillator causing lamp 314 to operate continuously. Detector 320 simultaneously forwards the initial return light level modulation to microprocessor 134 (MODULATION) which forwards START UP to gate 210 in power logic 144 and initiates WAIT PERIOD (3 seconds, for example). During WAIT PERIOD unit 110 is in DATA PROCESS MODE and MODULATION enters microprocessor 134 to determine whether the sequence of light levels is allowed data (PORT DATA from bar code 308) or a spuriously generated pulse sequence. PORT DATA is simultaneously advanced to temporary memory 230T and through display drive 330 to display device 136. The first N digits of PORT DATA may be one type of data (such as product number from data source 306) displayed in N digit display 332N, and the next Q digit of data may be another type of data (such as quantity) displayed in Q digit display 332Q. S digit display 332S displays status data generated during operation. The operator may view the new PORT DATA on display 136.

At the expiration of WAIT PERIOD (which is restarted by MODULATIONS) microprocessor 134 reestablishes the pulse lamp operation by forwarding LAMP DISABLE to lamp drive 324 which enables the pulsing oscillator. START UP terminates Vopr and system 110 is returned to STANDBY MODE.

KEY DATA

Input data, such as product numbers, may be manually entered into hand-held unit 110 through keyboard 132 (which includes keys for digits 0-9) and keyboard logic 340. The first key depressed initiates OPERATION MODE in unit 110 through START UP from microprocessor 134. As N digits of KEY DATA are keyed in, they appear simultaneously in temporary memory 240T and display device 136 starting with the left-hand digit (MSD) of N digit display 332N. The first N digits may be one class of data (product number, for instance), and the next Q digits may be another class of data such as quantity appearing display 332Q. After keying in N digits of product number and Q digits of quantity, the operator may key in CASE causing a low case "c" to appear in the LSD of display 332Q. This case data is processed to temporary memory 240T and then into main memory 240M. A data processor at remote terminal 404 will interpret this entry as an order by the case of the identified product. Alternatively, the operator may key in PRICE causing a lower case "p" to appear in display 332Q. This entry is interpreted a a request for price of a particular quantity of the identified product. OPERATION MODE is terminated after expiration of WAIT PERIOD which is renewed after each item keyed in.

KEYBOARD INSTRUCTIONS

Control signals are communicated to microprocessor 134 through INSTRUCTION keys on keyboard 132. Any INSTRUCTION immediately initiates OPERATION MODE.

ENTER INSTRUCTION causes the KEY DATA or PORT DATA in temporary memory 240T to enter main memory 240M at an address specified by microprocessor 134 (MEMORY ADDRESS). If desired ENTER may also extinguish display device 136 in order to conserve power in battery 204.

CLEAR INSTRUCTION causes erroneous KEY DATA or PORT DATA to be erased from temporary memory 240T and extinguished from display device 136. By observing display 136, the operator may detect a key in error, or notice an anomoly between the product number on data source 306 and the number in display 332N. Further, microprocessor 134 monitors for errors by continuously comparing the content of temporary memory 240T with the data displayed in device 136, and provides ERROR to alarm 304 as required.

RECALL INSTRUCTION has a SELECT MODE in which a particular previous product number (or portion thereof) is recalled, and a SEQUENTIAL MODE in which the entire contents of main memory 240M is systematically recalled. In SELECT MODE the desired product number (or portion thereof) is keyed in and the RECALL key depressed. Microprocessor 134 searches main memory 240T comparing every previous entry to the argument in temporary memory 240T. When a comparison is reached, the quantity originally entered with the desired product number appears in display 332Q, and alarm 304 is activated by an end-of-search signal (EOS) for microprocessor 134. In SEQUENTIAL MODE the RECALL key is pressed repeatedly and each entry in main memory 240M appears in displays 332N and 332Q starting with the most recent entry.

INFO INSTRUCTION deactivates the normal check digit required for normal entry to permit the entry of free format data such as dates, names and other miscellaneous information.

RESUME INSTRUCTION is employed when power module 140 is returned from service module 120 to control module 130 with a partially filled memory 240. RESUME INSTRUCTION permits microprocessor 134 to process the next data in to memory 240 at a LAST ENTRY POINTER to retain continuity between the new data and the previously gathered data. If the data in the returned power module 140 has already been transmitted or is otherwise no longer required, then preferably microprocessor 134 will start entering data at the beginning of memory 240 and ignore LAST ENTRY POINTER. This result is obtained by INITIALIZING microprocessor 134 with a CLEAR INTRUCTION in combination with an INFO INSTRUCTION.

C/P/S INSTRUCTION is employed to order case quantities instead of individual quantities, by depressing the C/P/S key once and then entering the number of cases. Prices, quotes and availability may be requested by depressing the C/P/S key twice and three times respectively. These requests are transmitted to remote terminal 404 by communication station 152. The response may be received from remote terminal 404 by communication station 152, and entered into memory system 146. The operator then displays the responses on display 136 through the RECALL INSTRUCTION.

SERVICE MODULE 120

After the data gathering with hand-held unit 110 is completed, the operator removes power module 140 from control module 130 and inserts it into communication station 152 (see FIG. 4). TRANSMISSION MODE is effected by depressing transmit button 408 which energizes transmit panel lamp 412. The operator first secures the remote station through the conventional telephone dialing system and then engages the telephone receiver 414 with telephone interface 416. Data transmission is initiated by RTT TONE from remote terminal 420. Data in power module 140 flows across transmit bus 418 into communication station 152 and out telephone receiver 414. After completion of the data transmission RST TONE from remote station 420 terminates TRANSMISSION MODE and energizes data received panel lamp 424. An erroneous transmission results in RST TONE which energizes retransmit lamp 428.

During portable mode data gathering memory 240 may become full which is indicated by alarm 304 and by an "F" in display 332Q. Also, Vbatt may drop below the threshold of low Vbatt detector 216 generating BATTERY which activates alarm 304 and causes unit 110 to immediately go into STANDBY MODE. The depleted power module is removed from control module 130 deactivating alarm 304, and replaced by a fresh power module with a fully charged battery 204 and an empty memory 240. The depleted power module is inserted into charge station 154 for recharging by charge circuit 430. Charge station 154 also provides temporary storage for power modules between data gathering missions. Preferably communication station 152 also provides for charging battery 204 which also can store power module 140 prior to and after transmission.

Minimum Vbatt detector 436 in charge station 154 monitors Vbatt during charging. If Vbatt drops below Vmin (which is lower than Vlow of low Vbatt detector 216) minimum Vbatt detector 436 provides OFF to power supply 220 terminating Vsby and Vmem. The termination of Vmem in the OFF MODE causes the loss of the data in volatile memory 240. This data may become unreliable after Vbatt drops below Vmin due to reduction of Vmem which is normally regulated through power supply 220 from Vbatt. Further, the reduced load condition accompanying OFF MODE facilitates charging battery 204.

Operating station 160 accommodates control module 130 and permits control module 130 to cooperate with power module 140 at charging station 154 to form a stationary data gathering unit with the same data processing capability as hand-held unit 110. Operate bus 440 between charging station 154 and operating station 160 provides power and data flow connection between power module 140 and control module 130. In the stationary mode, data probe 310 extends toward the backmost side surface of service module 120. The tip of data probe 310 is position generally coplanar with back side surface, permitting the back side surface to function as a guide for the items carrying bar code labels 306. The back side surface causes the items to remain on a path parallel to and equidistant from data probe 310.

Microprocessor 134 Program

The program for microprocessor 134 is stored in dedicated memory within ROM 350. The stored program becomes effective when microprocessor 134 is activated into the OPERATION MODE by DATA or INSTRUCTIONS from the peripheral hardware. The following flow table discloses one embodiment of the program for microprocessor 134.

| FLOW TABLE IN ROM 350 FOR OPERATING HAND-HELD UNIT 110 | |
|---|---|
| STATE = 1 (STANDBY) | |
| STEP 0 | STATE = 1 (STANDBY MODE) |
| STEP 1 | Microprocessor 134 receives restart interrupt caused by either:<br>(a) PORT DATA,<br>(b) KEY DATA, or<br>(c) INSTRUCTIONS. |
| STEP 2 | Microprocessor 134 loads program counter with contents of interrupt vector from ROM 350 to initiate START-UP operation. |
| STEP 3 | Program in ROM 350 initializes temporary memory 240t with internal flags. |
| DECISION A | Have power module 140 and control module B just been connected:<br>  YES  (a) Set new memory 240 flag in temporary memory 240t.<br>         (b) STATE = 1 (STANDBY MODE)<br>  NO   STEP 4 |
| STEP 4 | Enable scanner circuitry within microprocessor 134 for processing modulation |
| STEP 5 | Clear display 136 and initialized shift register in display drive 330. |
| STEP 6 | Poll keyboard 132 to determine if KEY DATA or INSTRUCTION present. |
| DECISION B | Is STATE = 1 (STANDBY MODE)?<br>  YES  DECISION C<br>  NO   DECISION O |
| DECISION C | Is MODULATION present?<br>  YES  DECISION D<br>  NO   STEP 7 |
| DECISION D | Is new memory 240 flag on?<br>  YES  STATE = 1 (STANDBY MODE)<br>  NO   DECISION E |
| DECISION E | Is FULL or FULL-1 active?<br>  YES  (a) Flash "F" on display 332s<br>         (b) Process MODULATION<br>         (c) DECISION EE<br>  NO   (a) Process MODULATION<br>         (b) DECISION EE |
| STEP | DISABLE scanner because no MODULATION present. |
| DECISION F | Is new memory flag on?<br>  YES  DECISION I<br>  NO   DECISION G |
| DECISION G | Has RESUME key been punched?<br>  YES  (a) Clear new memory 240 flag from temporary memory 240t<br>         (b) STATE = 1 (STANDBY MODE)<br>  NO   STEP 8 |
| DECISION H | Has CLEAR kay been punched?<br>  YES  (a) STATE = 3<br>         (b) STEP 8<br>  NO   STATE = 1 (STANDBY MODE) |
| STEP 8 | (a) Poll keyboard for INFO<br>(b) Return to DECISION B to determine STATE |
| DECISION I | Has RECALL key been punched?<br>  YES  (a) Initiate recall function in ROM 350 to display last product number entered in main memory 240m<br>         (b) STEP 21<br>  NO   DECISION J |
| DECISION J | Has ENTER key been punched?<br>  YES  DECISION K<br>  NO   DECISION L |
| DECISION K | Is FULL or FULL-1 flag active?<br>  YES  (a) Flash "F" in display 332s<br>         (b) STATE = 2<br>  NO   STATE = 2 |

-continued

| FLOW TABLE IN ROM 350 FOR OPERATING HAND-HELD UNIT 110 | | |
|---|---|---|
| DECISION L | Have any of ENTER, RECALL, RESUME, CLEAR keys been punched? | |
| | YES | STATE = 1 (STANDBY MODE) |
| | NO | DECISION M |
| DECISION M | Has C/P/S or INFO key been punched? | |
| | YES | (a) Store KEY DATA in BCD buffer in temporary memory 240t<br>(b) STATE = 12<br>(c) STEP 8 |
| | NO | DECISION N |
| DECISION N | Is FULL or FULL-1 flag active | |
| | YES | (a) Flash "F" in display 332s<br>(b) Store KEY DATA in BCD buffer in temporary memory 240<br>(c) STATE = 4<br>(d) STEP 8 |
| | NO | (a) Store KEY DATA in BCD buffer in temporary memory 240t<br>(b) STATE = 4<br>(c) STEP 8 |
| STATE = 2 (UNUSED MEMORY MODE) | | |
| DECISION O | Is STATE = 2? | |
| | YES | DECISION P |
| | NO | DECISION Q |
| DECISION P | Has CLEAR key been punched? | |
| | YES | STATE = 1 (STANDBY MODE) |
| | NO | STEP 8 |
| STATE = 3 (NEW MEMORY-RESUME MODE) | | |
| DECISION Q | Is STATE = 3? | |
| | YES | DECISION R |
| | NO | DECISION S |
| DECISION R | Has INFO key been punched? | |
| | YES | (a) Reset record pointer in temporary memory 240t to the first record.<br>(b) Reset new memory 240 flag.<br>(c) Clear FULL and FULL-1 flags.<br>(d) STATE = 1 (STANDBY) |
| | NO | (a) Clear display 136.<br>(b) Initialize shift register in display drive 330.<br>(c) STATE = 1 (STANDBY MODE) |
| STATE = 4 (ENTER MODE) | | |
| DECISION S | Is STATE = 4? | |
| | YES | DECISION T |
| | NO | DECISION BB |
| DECISION T | Have any of the number keys 0–9 been punched? | |
| | YES | DECISION U |
| | NO | DECISION X |
| DECISION U | Is code BBC? | |
| | YES | DECISION V |
| | NO | DECISION W |
| DECISION V | Has the check digit been entered through keyboard 132? | |
| | YES | STEP 9 |
| | NO | STEP 11 |
| STEP 9 | Store check digit in BCD buffer in temporary memory 240t. | |
| STEP 10 | (a) Calculate check digit.<br>(b) DECISION EE | |
| DECISION W | Has last digit of product code been entered through keyboard 132 onto display 332n (position 11 from left)? | |
| | YES | STEP 9 |
| | NO | STEP 11 |
| STEP 11 | (a) Store last entered digit of product code from keyboard 132 in BCD buffer in temporary memory 240t.<br>(b) STEP 8. | |
| DECISION X | Has CLEAR Key been punched? | |
| | YES | (a) Clear display 136.<br>(b) Initialize shift register in display drive 330.<br>(c) State = 1 (STANDBY MODE). |
| | NO | DECISION Y |
| DECISION Y | Has ENTER key been punched? | |
| | YES | STEP 12 |
| | NO | DECISION Z |
| STEP 12 | (a) Flash "E" on display 332s.<br>(b) Activate alarm 304.<br>(c) STATE = 5<br>(d) STEP 8 | |
| DECISION Z | Has RESUME key been punched? | |
| | YES | STEP 12 |
| | NO | DECISION AA |
| DECISION AA | Has RECALL key been punched? | |
| | YES | STEP 13 |
| | NO | STEP 14 |
| STEP 13 | (a) Initialized SEARCH function in ROM 350 searching main memory 240t for contents of display 240n.<br>(b) STEP 21 | |
| STEP 14 | (a) Store last digit entered of product code in BCD buffer in temporary memory 240t.<br>(b) STATE = 12 | |

4,143,417

-continued

FLOW TABLE IN ROM 350 FOR OPERATING HAND-HELD UNIT 110

(c) STEP 8

STATE = 5 (INITIATE STANDBY MODE)

| | | |
|---|---|---|
| DECISION BB | Is STATE = 5? | |
| | YES | DECISION CC |
| | NO | DECISION DD |
| DECISION CC | Has CLEAR key been punched? | |
| | YES | (a) Clear display 136. |
| | | (b) Initialize shift register in display drive 330. |
| | | (c) STATE = 1 |
| | NO | STEP 8 |

STATE = 6 (CHECK DIGIT MODE)

| | | |
|---|---|---|
| DECISION DD | Is STATE = 6? | |
| | YES | DECISION EE |
| | NO | DECISION LL |
| DECISION EE | Is MODULATION present? | |
| | YES | DECISION GG |
| | NO | DECISION FF |
| DECISION FF | Is code BBC? | |
| | YES | DECISION GG |
| | NO | STEP 15 |
| DECISION GG | Is computed check digit equal to check digit entered through keyboard 132? | |
| | YES | DECISION HH |
| | NO | STEP 12 |
| DECISION HH | Is MODULATION present? | |
| | YES | STEP 15 |
| | NO | DECISION JJ |
| STEP 15 | Display hyphen in check digit position on display 332n | |
| DECISION II | Is MODULATION present? | |
| | YES | STEP 16 |
| | NO | (a) Save check digit in BCD buffer in temporary memory 240t. |
| | | (b) STEP 16 |
| STEP 16 | Increment BCD buffer pointer in temporary memory 240t. | |
| STEP 17 | Increment display buffer address in temporary memory 240t. | |
| DECISION JJ | Is FULL flag set? | |
| | YES | STEP 18 |
| | NO | DECISION KK |
| DECISION KK | Is FULL-1 flag set? | |
| | YES | (a) Activate alarm 304 |
| | | (b) STEP 18 |
| | NO | (a) Flash "A" in display 332s |
| | | (b) STEP 18 |
| STEP 18 | (a) STATE = 7 | |
| | (b) STEP 8 | |

STATE = 7 (QUANTITY MODE)

| | | |
|---|---|---|
| DECISION LL | Is STATE = 7? | |
| | YES | DECISION MM |
| | NO | DECISION VV |
| DECISION MM | Has CLEAR key been punched? | |
| | YES | (a) Clear display 136 |
| | | (b) Initialize shift register in display drive 330 |
| | | (c) STATE = 1 (STANDBY MODE) |
| | NO | DECISION NN |
| DECISION NN | Has RECALL key been punched? | |
| | YES | STEP 13 |
| | NO | DECISION OO |
| DECISION OO | Has any number key (0-9) or INFO key or C/P/S key been punched? | |
| | YES | DECISION PP |
| | NO | DECISION RR |
| DECISION PP | Is data of DECISION OO the first quantity digit on display 332q? | |
| | YES | (a) Store data of DECISION OO in BCD buffer |
| | | (b) Step "A" flashing (if required) |
| | | (c) STEP A |
| | NO | DECISION QQ |
| DECISION QQ | Is data of DECISION OO the fourth quantity digit of display 332q? | |
| | YES | STEP 12 |
| | NO | STEP 11 |
| DECISION RR | Has ENTER key been punched? | |
| | YES | DECISION SS |
| | NO | STEP 8 |
| DECISION SS | Is data of DECISION OO the first digit of display 332Q? | |
| | YES | DECISION TT |
| | NO | STEP 12 |
| DECISION TT | Is FULL flag active? | |
| | YES | STEP 20 |
| | NO | STEP 19 |
| STEP 19 | Enter data in display 332N and 332Q into main memory 240M. | |

STATE = 8 (MAIN MEMORY STATUS MODE)

| | | |
|---|---|---|
| DECISION UU | Is STATE = 8? | |
| | YES | DECISION VV |

-continued

FLOW TABLE IN ROM 350 FOR OPERATING HAND-HELD UNIT 110

| | | NO | DECISION WW |
|---|---|---|---|
| DECISION VV | | Is FULL or FULL-1 flag active? | |
| | | YES | STEP 20 |
| | | NO | STATE = 1 (STANDBY MODE) |
| STEP 20 | | (a) Flash "F" on display 332S | |
| | | (b) Activate alarm 304 | |
| | | (c) STATE = 5 | |
| | | (d) STEP 8 | |
| NO STATE = 9 | | | |

STATE = 10 (SEARCH & RECALL MODE I)

| DECISION WW | Is STATE = 10? | |
|---|---|---|
| | YES | STEP 21 |
| | NO | DECISION YY |
| STEP 21 | Execute search function in ROM 350. Locate the contents of display 332N in main memory 240M. | |
| DECISION XX | Has contents of display 332N been located in main memory 332N? | |
| | YES | (a) Clear display 136 |
| | | (b) STEP 22 |
| | NO | STEP 25 |
| STEP 22 | Display "S" in display 332S. | |
| STEP 23 | Display located contents of main memory 240M in display 332N and 332Q. | |
| STEP 24 | (a) STATE = 11 | |
| | (b) STEP 8 | |
| STEP 25 | Clear display 136 | |
| STEP 26 | Display S in display 332S. | |
| STEP 27 | (a) Activate alarm 304 | |
| | (b) STATE = 5 | |
| | (c) STATE 8 | |

STATE = 11 (SEARCH & RECALL MODE II)

| DECISION YY | Is STATE = 11? | |
|---|---|---|
| | YES | DECISION ZZ |
| | NO | DECISION CCC |
| DECISION ZZ | Has CLEAR key been punched? | |
| | YES | (a) Clear display 136 |
| | | (b) |
| | | (c) |
| | NO | DECISION AAA |
| DECISION AAA | Has RECALL key been punched? | |
| | YES | DECISION BBB |
| | NO | STEP 8 |
| DECISION BBB | Is temporary main memory pointer at location zero? | |
| | YES | STEP 25 |
| | NO | STEP 21 |

STATE = 12 (MISC INFORMATION MODE)

| DECISION CCC | Has CLEAR key been punched? | |
|---|---|---|
| | YES | (a) |
| | | (b) |
| | | (c) |
| | NO | DECISION DDD |
| DECISION DDD | Has RECALL key been punched? | |
| | YES | STEP 13 |
| | NO | DECISION EEE |
| DECISION EEE | Has ENTER key been punched? | |
| | YES | STEP 19 |
| | NO | DECISION FFF |
| DECISION FFF | Has last digit of MISC INFORMATION been entered? | |
| | YES | STEP 12 |
| | NO | DECISION GGG |
| DECISION GGG | Has number key (0–9) or C/P/S key or INFO key been punched? | |
| | YES | (a) Store digit of DECISION GGG in the BCD buffer |
| | | (b) STEP 8 |
| | NO | STEP 12 |

POWER SUPPLY 220

FIGS. 5 and 6 show the elements of power source 220 and the waveforms generated therein during operation. Power source 220 converts the voltage from supply battery 204 (Vbatt) into a regulated voltage (Vopr) for application throughout hand-held unit 110. Unit 110 is a variable load because the current requirements of display 136, alarm 304, lamp 314, and control logic 134 vary from zero during STANDBY MODE to a maximum value for data processing OPERATIONAL MODE. In addition, the value of Vbatt varies from a fully charged value (Vmax) to a lower value (Vmin) below which power supply 220 is turned OFF by service module 120 terminating all the voltages including Vmem.

Input transistor Q1 is periodically turned on causing current from battery 204 to build up in inductor 504. Inductor 504 then discharges into output capacitor 510 through output transistor Q2. The amount of energy transferred from inductor 504 to capacitor 510 depends on the charging period of inductor 504. This charging period is regulated by controlling the charging cycle (on time) of transistor Q1 in response to variations in the output voltage Vopr across capacitor 510.

The on time for charging transistor Q1 is determined by the relationship between SW RAMP switching signal from ramp generator 516 and an FB LEVEL from feed back amplifier 520 (see FIG. 6, waveform I). When RAMP is less than FB LEVEL (the shaded region of waveform I from t=0 to t=1) input comparator 524 pulls the base of charging transistor Q1 up to Vbatt turning transistor Q1 on. When SW RAMP is greater than FB LEVEL, comparator 524 turns transistor Q1 OFF by driving the base to ground (see waveform II). Transistor Q1 does not switch on immediately, but is delayed slightly by switching transients such as stored base charge in Q1 and the tendency of inductor 504 to oppose changes in current level (prior to output transistor Q2 turning on). The collector voltage of transistor Q1 (see waveform III) has a rise time extending from t=1 to t=2 caused by the above delay. The collector current of transistor Q1 (see waveform IV) has a corresponding delay time caused by the increasing emitter-collector impedance of transistor Q1 as transistor Q1 closes down. The product of the rising collector voltage VcQ1 and the falling collector current IbQ1 during the transient period between t=1 and t=2 (the shaded area on waveforms III and IV) represents power lost to ground each time transistor Q1 is turned on. This switching power loss may be minimized by turning on transistor Q2 immediately after transistor Q1 starts to turn off. Transistor Q2 is turned on rapidly by control transistor Q3. During OPERATION MODE control transistor Q3 is base-biased on by a control current from battery 204 through base resistor 512. Transistor Q3 becomes forward-biased and starts to conduct collector current (IceQ3) at t−1 as the field in inductor 504 begins to collapse causing VcQ3 to increase. Control transistor Q3 conducts when:

$$VcQ3 > Vopr + VsatQ3 + VbeQ2$$

IceQ3 contributes to IbQ2 causing transistor Q2 to conduct, permitting the transfer current from the collapsing field of inductor 504 (see waveform V) to flow into output capacitance 510. Transistor Q2 functions as a periodic switch which passes transfer current when forward-biased (discharge cycle t=2 to t=4) and which isolates Vopr from VcQ2 where reversed biased (charging cycle t=0 to t=1). During the charging cycle Q1 is on and Vc (Q1, Q2, and Q3) are at VceQ1 (the internal diode drop across Q1) which reverse-biases Q2 preventing capacitor 510 from discharging to ground through Q1. In addition, Q2 functions as an OPERATE-STANDBY switch in response to base current from Q3. During STANDBY MODE, PREOPERATE bar (ground) is applied from control module 130 to the base of Q3. The Q3 control current is grounded and IbQ3 goes to zero-biasing Q3 off. Q3 cannot conduct in response to the collapsing inductive field and Vopr drops to zero as capacitor 510 discharges. PREOPERATE from control module 130 removes the ground restoring Q3 to the biased on condition and establishing OPERATE MODE in which Q2 periodically conducts charging capacitor 510 to Vopr.

Transistor Q3 provides the gain which permits the small resistor 512 control current to switch the much larger transfer current through switching transistor Q2. During STAND-BY MODE, which is the predominating mode, the control current is lost to ground via PREOPERATE bar. Reducing the control current through the gain of Q2 reduces the overhead energy consumption of hand-held unit 110. The control current is determined by the voltage dividing network formed by base resistor 512 and emitter resistor 514:

$$IbQ3 = Vbatt/(R512 + R514)$$

This fixed value for IbQ3 limits IcQ3max as the inductor field collapses. IbQ2 is formed by a portion of IeQ3 (which equals IcQ3 + IbQ3) depending on the value of R514. As a result, IceQ2 is also current-limited by IbQ3. The transfer current IceQ2 is fixed at IceQ2max during the initial portion of the discharge cycle (t=2 to t=3) in spite of the high Vc (Q1, Q2, Q3) generated by the inductive kick of inductor 504.

In addition to current-limiting between IceQ2 and IbQ3 during the discharge cycle, Q2 is biased slightly on during the charge cycle by IbQ2 which is now a portion of the fixed IbQ3. This slight base current bias reduces the conducting switching transients when Q2 becomes forward-bias at t=1. Full conduction of Q2 is attained faster and the time period between t=1 to t=2 is shortened, minimizing the power loss through Q1 and Q1 shuts down.

OVERLOAD PROTECTION

FB amplifier 520 is a high gain differential amplifier which limits the maximum charging cycle of inductor 504 for limiting the maximum current drain from battery 204 in an overload situation. As Vopr drifts from the regulated value (which is +5 volts in the disclosed embodiment) IbQ4 varies causing a corresponding change in IcQ4 and IceQ4. FB LEVEL is taken from the collector of Q4. Overload and short circuit protection is provided by Q4 which turns off if Vopr drops below a predetermined value. At IbQ4=0, FB LEVEL (VcQ4) is fixed at a value FBmax determined by output voltage dividing network R532 and R534. No matter how low Vopr drops due to overloading, FB LEVEL cannot exceed FBmax which defines the maximum charging time for inductor 504 limiting the maximum current drain from battery 204. Q5 and network R4 and R5 fix the value of VeQ4 as IceQ4 varies due to Vopr fluctuations.

DETAILED DESCRIPTION OF THE COMPONENTS OF THE BEST MODE

Keyboard 132 may be suitable keyboard device having decimal digit keys 0–9, and function keys for INSTRUCTIONS.

Display 136 may be a conventional LED display, formatted into provide a plurality of smaller displays for each class of data in a separate position.

Data port 138 may be any suitable conventional optical pen.

Battery 204 may be four sub c nickel cadmium cells of 1.25 volts apiece for providing the 5-volt battery voltage.

Start-up delay 226 may be a series of Cmos digital counters connected in cascade to provide a suitable start-up period for power supply 220 between PREOPERATE and OPERATE.

Memory control 230 may be a conventional memory control and dynamic refresh generator.

Addresser 234 may be any suitable IC device which can apply MEMORY ADDRESS received from microprocessor 134 to memory 240, with an internal counter for generating sequential refresh addresses.

Memory system 146 may be a conventional dynamic random-access memory (RAM).

Microprocessor 134 may be any suitable integrated microprocessor operable with +5 volts (Vopr).

Drive display 330 may be any suitable current driver for operating display 136. The display decoding may be accomplished by microprocessor 134.

Keyboard logic 340 may be any conventional device capable of interfacing between the decimary digits 0 through 9 from keyboard 132 and the binary requirements of microprocessor 134.

ROM 350 may be any conventional read-only memory such as a series of 9316's.

Resistors 512 and 514 may be 33K ohms and 10K ohms respectively.

Ramp generator 516 may be any suitable sawtooth generator for providing at least one sloped face. A double sided ramp function is preferred, however, because both the initiation and the termination of the charging cycle (t=0 to t=1) are regulated. The ramp generator shown in FIG. 5 employs an analog comparator 524 (LM339) which oscillates at about 100KHz between a positive slope mode and a negative slope mode. During the positive slope mode, the comparator has a high impedance and Vsby is applied to the comparator via a voltage dividing network of resistors. During the negative slope mode, the comparator has a low impedance forcing the output of the comparator to ground. Vsby is applied to the comparator via a modified voltage dividing network, which includes a portion of the positive slope network.

Q1 may be a 2N4896, Q2 may be a 2N4895, and Q3, Q4, and Q5 may be 2N2222's. Vopr is +5 volts dc, Vsby is +12 volts dc, and Vmem is −5 volts dc.

CONCLUSION

The objects of this invention have been accomplished by the functions into modular units — a control module for data enter and control, an exchangeable power-memory module, and a service module which interfaces with the detached power-memory module to replenish the power and transmit the data and which interfaces with the control module to establish stationary operation between the control module and the power-memory module. The power cannot be removed from the memory in normal operation because they are housed in the same module. Data probe 310 may be scanned across bar code label 306 by an operator with one hand, leaving the other hand free to reorganize the inventory.

It will be apparent to those skilled in the art that various changes may be made in the described apparatus and technology without departing from the scope of the invention. For example, a plurality of transmitting stations 152 may be provided for transmitting the data from a plurality of power modules 140, forming sequential groups of data at remote terminal 404. The plurality of charge stations 154 may be provided to permit a plurality of power modules 140 to cooperate with control module 130 in the stationary mode. The SEARCH function would involve many memorys as opposed to the single memory searching inherent in the portable mode. Accordingly, the scope of this invention should be determined only by the wording of the following claims and their legal equivalents.

We claim as our invention:

1. A system for receiving input data, storing the data, and transmitting the data to a remote terminal, comprising:
    a control module for receiving the input data and controlling the flow of the data;
    a power-memory module which is removably connected to the control module to form a self-contained self-powered, completely hand-held, one piece unit, the power-memory module contains:
        a solid state memory means for storing the data processed thereto by the control module; and
        a rechargeable battery for maintaining the status of the data in the memory means and for activating the control module;
    a first cover means for housing the control module;
    a second cover means separate from the first cover means for housing the memory means and the rechargeable battery together within the power-memory module to prevent disconnection of the rechargeable battery from the memory means during operation;
    interconnect means formed through the first and second cover means for electrically and mechanically connecting the control module to the power-memory module and disconnecting the control module from the power-memory module;
    mode means in the hand-held unit for maintaining a low power level standby mode in the hand-held unit during the absence of input data, and temporarily establishing an operating mode for processing data as input data becomes available; and
    a service module which removably connects with at least the power-memory module for recharging the rechargeable battery and for transmitting the data in the memory means to a remote terminal.

2. The system of claim 1, further comprising additional power-memory modules which may be removably connected to the control module in sequence in exchange for a previous power-memory module which has been removed from the control module and connected to the service module.

3. The system of claim 2, wherein the service module has a plurality of power-memory module stations for recharging the rechargeable battery and transmitting the data in the memory means.

4. The system of claim 3, wherein the service module has a control module station which removably connects with the control module for activating the control module and for permitting the control module to interface with at least one of the plurality of power-memory modules.

5. The system of claim 4, wherein the solid-state memory has a main memory portion for storing the data, and a temporary memory portion for receiving the data from the control module and controlling the data flow into the main memory portion.

6. The system of claim 5, wherein the main memory portion is a random access memory permitting selected portions of the data received from the control module to be placed in the data storage portion.

7. The system of claim 6, wherein the control module has a keyboard means for entering data into the temporary memory portion.

8. The system of claim 7, wherein the control module has a display means for displaying data from the temporary memory portion of the memory means.

9. The system of claim 8, wherein the display means has a plurality of display sections arranged in a group for displaying each class of data separately.

10. The system of claim 1, wherein the service module also receives data from the remote terminal for storage in the memory means.

11. The system of claim 1, further comprising a sensor means extending from the control module for detecting input data and forwarding the input data to the control module.

12. The system of claim 11, wherein the sensing means is light-responsive for detecting input data in the form of contrasting light levels generated by relative motion between the sensing means and the input data source.

13. The system of claim 12, wherein the sensing means is a rigid light-responsive probe extending from the control module.

14. The system of claim 13 wherein:
the control module has a keyboard for entering input data and instructions and a display means for displaying the data;
the service module removably connects with the control module and supports the control module when connected thereto so as to permit viewing of the keyboard and display means.

15. The system of claim 14, wherein the rigid light-responsive probe extends from the control module toward a side surface of the service module, and the tip of the probe is located coplanear with the side surface of the service module whereby the side surface guides the input data source along a straight path past the tip of the light-resonsive probe.

16. The system of claim 4, wherein the memory means is placed into the read mode during the standby mode.

* * * * *